United States Patent [19]
Bremner et al.

[11] Patent Number: 5,598,467
[45] Date of Patent: Jan. 28, 1997

[54] SIGNAL INTERFACE CIRCUIT WITH SELECTABLE SIGNAL INTERFACE PARAMETERS

[75] Inventors: Duncan J. Bremner, Lochwinnoch; Roger K. Benton, Edinburgh, both of Scotland; James B. Wieser, Pleasanton, Calif.

[73] Assignee: National Semiconductor Corporation, Santa Clara, Calif.

[21] Appl. No.: 353,095

[22] Filed: Dec. 9, 1994

[51] Int. Cl.$^6$ .................................................. H04M 1/76
[52] U.S. Cl. ........................... 379/398; 379/399; 379/402
[58] Field of Search ........................................ 379/398, 399, 379/406, 402, 412, 403

[56] References Cited

U.S. PATENT DOCUMENTS

| | | | |
|---|---|---|---|
| 4,476,350 | 10/1984 | Aull et al. | 179/70 |
| 4,588,858 | 5/1986 | Watts et al. | 330/260 |
| 4,706,244 | 11/1987 | Watson et al. | 379/160 |
| 4,918,725 | 4/1990 | Takahashi | 379/398 |
| 5,422,948 | 6/1995 | Nishimura | 379/399 |
| 5,459,787 | 10/1995 | Tomasini et al. | 379/398 |
| 5,473,685 | 12/1995 | Mulder | 379/398 |
| 5,528,683 | 6/1996 | Tomasini et al. | 379/398 |

*Primary Examiner*—Krista M. Zele
*Assistant Examiner*—Jacques M. Saint-Surin
*Attorney, Agent, or Firm*—Limbach & Limbach L.L.P.

[57] ABSTRACT

A signal interface circuit with selectable signal interface parameters for a telephone subscriber line includes an impedance circuit having a selectable impedance value, signal terminals having an associated, definable termination impedance, a transmitter circuit having a definable transmitter transfer function and a receiver circuit having a definable receiver transfer function. The signal terminals connect to an external signal line pair having an associated line impedance for conducting outgoing and incoming signals therefrom and thereto, respectively. The transmitter circuit receives the outgoing signal from the signal terminals and provides a transmit signal in accordance with its transmitter transfer function. The receiver circuit, which includes a differential transconductance amplifier, receives an input signal and the transmit signal and provides the incoming signal to the signal terminals in accordance with its receiver transfer function. The termination impedance, transmitter transfer function and receiver transfer function are all defined by the selectable impedance, with the termination impedance defined to match the line impedance.

29 Claims, 9 Drawing Sheets

SIGNAL INTERFACE CIRCUIT WITH SELECTABLE SIGNAL INTERFACE PARAMETERS

BACKGROUND OF THE INVENTION

1. Field of the Invention

The present invention relates to signal interface circuits, and in particular, to signal interface circuits in which specific circuit parameters and performance characteristics, such as signal gain and terminal impedance, can be selectively controlled.

2. Description of the Related Art

Conventional signal interface circuits exist in many forms and configurations for performing many different functions. One function often performed by such circuits is that of impedance matching whereby two circuits or systems having different impedances can be interconnected so as to provide for maximum power transfer or signal gain. However, due to the inherent frequency dependency of all impedances, the impedance matching, power transfer and signal gain characteristics are dependent upon the frequencies of the signals being conveyed by such interface circuits and can, therefore, vary significantly. Further, attempts to optimize these performance parameters, i.e. establishing and maintaining the desired frequency response characteristics for these performance parameters, can be quite difficult since adjustment of one will generally affect the others as well.

This problem becomes further complicated when the interface circuit must pass signals in two directions. For example, the interface circuit may be required to provide impedance matching and signal gain adjustment simultaneously for transmit and receive circuits which are connected to and must send bidirectional signals through a shared signal node. One example of a circuit requiring such two-way impedance matching and frequency compensation is a subscriber line interface circuit used in telecommunications. Such an interface circuit must provide a complex impedance termination and matching transmit and receive frequency response characteristics to the subscriber line which is attached at the "tip" and "ring" terminals and which itself has a complex impedance associated therewith.

In conventional interface circuits of this type, optimization or adjustment of multiple performance parameters is typically done by providing for the adjustment or design of circuit components or groups Of circuit components which correspond to each individual performance parameter. For example, one set of circuit components would be designed or adjusted to provide for a desired complex impedance termination, while other circuit components would be designed or adjusted to provide for the desired transmit or receive signal frequency responses. Accordingly, matching all three performance parameters can be quite difficult.

This problem of matching multiple performance parameters is further exacerbated when manufacturing tolerances, temperature and other effects are taken into consideration. The circuit component or components designed or adjusted to provide these desired performance parameters must often be matched to one another and will have multiple parameter "bandwidths", i.e. a "bandwidth" associated with each operating parameter such as temperature, etc. Therefore, not only must each performance parameter be matched, but they must remain matched as various operating parameters, such as temperature, vary.

Accordingly, it would be desirable to have a signal interface circuit with selectable signal interface parameters which simplify the providing and maintaining of desired impedance and signal frequency response characteristics.

SUMMARY OF THE INVENTION

An apparatus including a signal interface circuit with selectable signal interface parameters in accordance with one embodiment of the present invention includes an impedance terminal, a pair of signal terminals, a transmitter circuit and a receiver circuit. The impedance terminal is for coupling to an impedance circuit having an associated, selectable impedance value. The pair of signal terminals has an associated, definable termination impedance which is defined in accordance with the selectable impedance value, and is for coupling to an external signal line pair having an associated line impedance for conducting outgoing and incoming signals therefrom and thereto, respectively. The transmitter circuit is coupled to the pair of signal terminals, has an associated, definable transmitter transfer function which is defined in accordance with the selectable impedance value and is for receiving the outgoing signal and providing a transmit signal in accordance with the definable transmitter transfer function. The receiver circuit is coupled to the impedance terminal, the pair of signal terminals and the transmitter circuit, has an associated, definable receiver transfer function which is defined in accordance with the selectable impedance value and is for receiving an input signal and the transmit signal and providing the incoming signal in accordance with the definable receiver transfer function.

A method of providing a signal interface with selectable signal interface parameters in accordance with another embodiment of the present invention includes the steps of: defining a termination impedance in accordance with a selectable impedance value; defining a transmitter transfer function in accordance with the selectable impedance value; defining a receiver transfer function in accordance with the selectable impedance value; coupling to a signal line pair having an associated line impedance with a pair of signal terminals having the defined termination impedance associated therewith; conducting an outgoing signal from the signal line pair via the pair of signal terminals; amplifying the outgoing signal and providing a transmit signal in accordance with the defined transmitter transfer function; receiving an input signal and the transmit signal and providing an incoming signal in accordance with the defined receiver transfer function; and conducting the incoming signal to the signal line pair via the pair of signal terminals, These and other features and advantages of the present invention will be understood upon consideration of the following detailed description of the invention and the accompanying drawings,

DETAILED DESCRIPTION OF THE INVENTION

Figure 1:
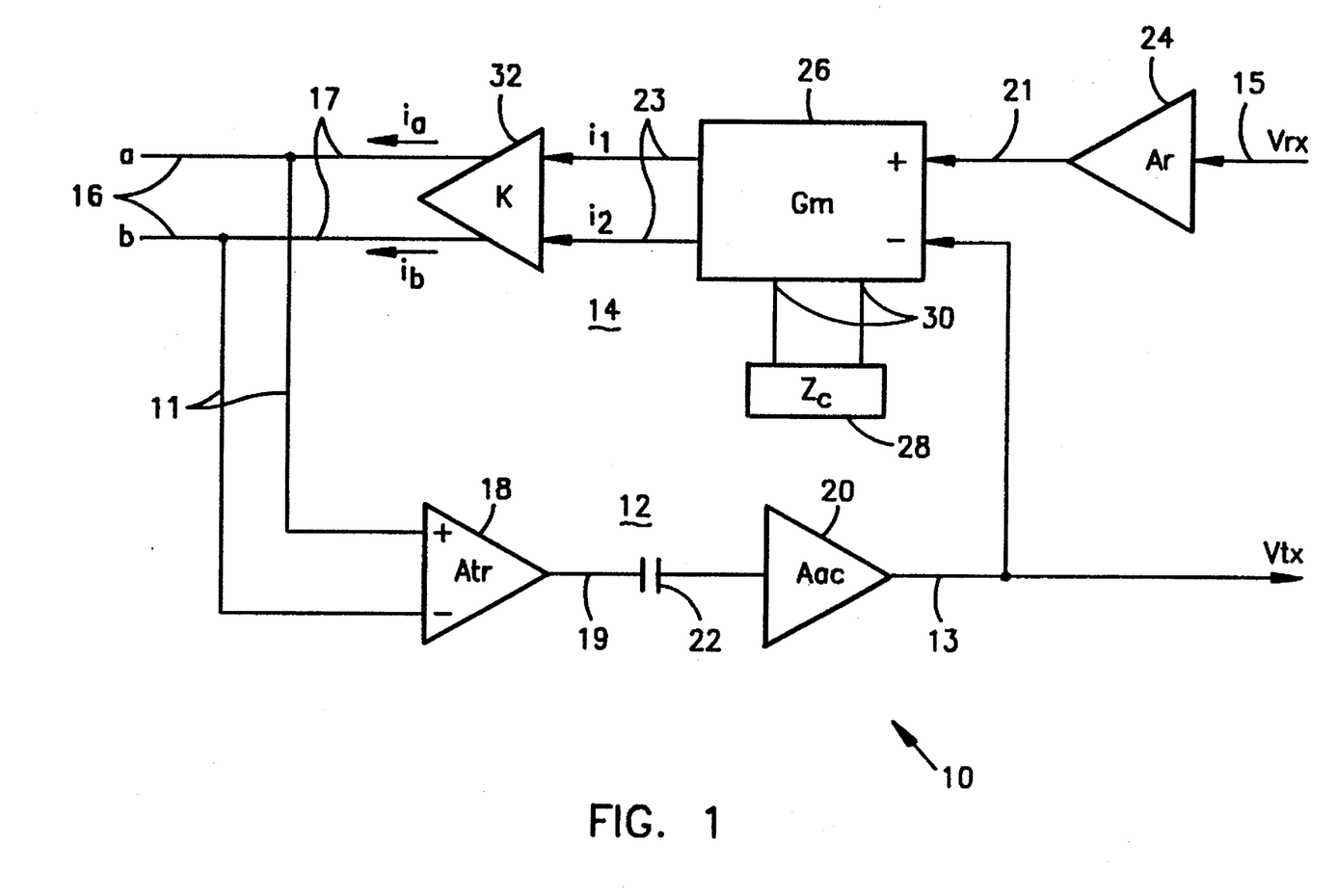
FIG. 1 is a functional block diagram of the small ac signal equivalent circuit for a signal line interface circuit with selectable signal interface parameters in accordance with one embodiment of the present invention.

Referring to FIG. 1, a signal interface circuit 10 with selectable signal interface parameters in accordance with one embodiment of the present invention includes a transmitter circuit 12 and a receiver circuit 14 connected to an external signal line pair 16 (e.g. the "tip" and "ring" terminals of a telephone subscriber line). The transmitter circuit 12 includes a differential voltage amplifier 18 having a transfer function $A_{tr}$ and a buffer amplifier 20 having a transfer function $A_{ac}$ capacitively coupled by a capacitor 22. The receiver circuit 14 includes a buffer amplifier 24 having a transfer function $A_r$, a differential transconductance amplifier 26 having a transconductance $G_m$, an impedance circuit 28 having a selectable impedance $Z_c$ (connected via impedance terminals 30 to the transconductance amplifier 26) and a differential current amplifier 32 having a transfer function K. (The "transfer functions" discussed herein are intended to refer to the small ac signal components of the subject transfer functions.)

The differential amplifier 18 of the transmitter circuit 12 receives an outgoing signal 11 from the signal line pair 16 and provides a voltage signal 19 which is capacitively coupled by the capacitor 22 and further amplified by the buffer amplifier 20 to produce a transmit signal $V_{tx}$ 13. Accordingly, the transmit signal 13 is produced in accordance with the transmitter transfer function (discussed further below).

In the receiver circuit 14, the input buffer amplifier 24 receives a receive signal $V_{rx}$ 15 and provides a buffered input signal 21 which is received differentially with the transmit signal 13 by the transconductance amplifier 26. In accordance with its transconductance $G_m$, as defined by the selectable impedance $Z_c$, the transconductance amplifier 26 provides a differential output current $i_1-i_2$ 23 which is amplified by the differential current amplifier 32 to provide a differential output current $i_a-i_b$ 17 to the signal line pair 16. Accordingly, the output current 17 is produced in accordance with the receiver transfer function (discussed further below).

Throughout the discussion, "outgoing", "transmit", "incoming" and "receive" are defined with respect to the telephone. For example, outgoing, or transmit, signals originate in a telephone (not shown) connected to the signal line pair 16 and pass into the signal interface circuit 10 and out thereof as the $V_{tx}$ signal to a network (not shown), while incoming, or receive, signals come into the signal interface circuit 10 from the network as the $V_{rx}$ signal and out thereof to the telephone via the signal line pair 16. However, it should be understood, that these "directions" are merely exemplary and the claimed invention is not necessarily limited to such directivity.

The signal interface circuit 10 has a number of advantages which make it quite useful as a subscriber line interface circuit for a telecommunications system. In such a system, it is often required to provide a complex impedance termination for the signal line pair 16 while simultaneously providing transmit and receive transfer functions which have frequency responses matching those of the subscriber line pair 16 attached to terminals a and b, which itself has a complex impedance associated therewith. As discussed further below, the signal interface circuit 10 allows the termination impedance, i.e. the impedance as defined across the signal line pair 16, as well as the transmit and receive transfer functions to be defined using one scaled complex impedance $Z_c$ to set all three parameters. As a result, all three parameters will closely track one another over temperature, etc., thereby eliminating the need for multiple adjustments or matching networks. Accordingly, the relative signal gains and frequency response characteristics of the transmit and receive transfer functions can be easily set as desired.

The transconductance $G_m$ of the transconductance amplifier 26 is defined by the impedance $Z_c$ of the impedance circuit 28 such that the differential output current 17 is a function of the differential input voltage, i.e. the voltage levels V+ and V− of the input signal 21 and transmit signal 13 at the non-inverting and inverting inputs, respectively, as follows:

$$i_{out} = i_1 - i_2 \quad (1a)$$

$$i_{out} = \frac{2(V_+ - V_-)}{Z_C} \quad (1b)$$

The differential output current 17 provided to the signal line pair 16 is a function of the current amplifier 32 gain K and its differential input current 23, as follows:

$$i_{ab} = i_a - i_b = \frac{K}{2}(i_1 - i_2) \quad (2)$$

It should be noted that, in practice, this gain K has second order gain and phase errors versus frequency. Accordingly, care should be taken to ensure that such errors have negligible effect upon the impedance desired at the signal line pair 16.

The output impedance $Z_o$ of the signal interface circuit 10 is essentially the output impedance, as defined by the feedback transfer function, of the current amplifier 32 (since the input impedance of the input transmitter amplifier 18 is so high as to have negligible effect). Accordingly, the output impedance $Z_o$ is a function of the differential output voltage $V_{ab}$ and differential output current $i_{ab}$ (defined above) provided to the signal line pair 16 as follows:

$$Z_o = \frac{\delta V_{ab}}{\delta I_{ab}} \quad (3a)$$

$$Z_o = \frac{Z_C}{A_{tr}A_{ac}K} \quad (3b)$$

Therefore, the output impedance $Z_o$ presented to the signal line pair 16 nodes a, b is directly proportional to the impedance $Z_c$ of the impedance circuit 28 connected to the transconductance amplifier 26.

Based upon the foregoing, the receiver transfer function, i.e. defined as the output voltage $V_{ab}$ provided in accordance with a receive signal $V_{rx}$ to a signal line pair 16 having a line impedance $Z_L$, can be defined as follows:

$$\frac{V_{ab}}{V_{rx}} = \frac{Z_L}{\left[\dfrac{Z_C}{A_{ac}A_{tr}K} + Z_L\right]} \cdot \frac{A_r}{A_{ac}A_{tr}} \quad (4)$$

Similarly, the transmitter transfer function, i.e. the transmit signal $V_{tx}$ generated as a result of receiving a signal $V_s$ from the signal line pair having a source impedance $Z_L$, can be defined as follows:

$$\frac{V_{tx}}{V_s} = \frac{Z_C}{\left[\frac{Z_C}{A_{ac}A_{tr}K} + Z_L\right]} \cdot \frac{1}{K} \quad (5)$$

As can be seen in the above equations, the transmitter and receiver transfer functions, and therefore their frequency response characteristics, as well as the output impedance $Z_o$ presented to the signal line pair 16 are a function of the selectable impedance $Z_c$ and the signal line pair 16 impedance $Z_L$. Accordingly, all three parameters are controlled by a single impedance (since the signal line pair 16 impedance $Z_L$ is fixed) and, therefore, track each other over changes in temperature, etc.

Based upon the foregoing discussion, the operation of the signal interface circuit 10 can be summarized as follows. The termination impedance presented to the signal line pair 16 is defined as a change in voltage divided by a change in current (dV/dI). Hence, in order to generate a change in the line current ($i_a-i_b$), the voltage at the inverting terminal of the transconductance amplifier 26 must change relative to that at the noninverting terminal. Assuming no receive signal 15 is being received, this change in the inverting input must originate from a change in the voltage across the signal line pair 16. Hence, a change in the line voltage results in a change in the line current, thereby defining an impedance. Accordingly, an outgoing signal 11 received at the signal line pair 16 causes the termination impedance to be defined, based upon the selectable impedance $Z_c$ (since virtually no frequency dependency is introduced by the differential amplifier 18 and buffer amplifier 20). Further accordingly, a buffered input signal 21 based upon a receive signal 15 is applied to the transconductance amplifier 26 differentially with respect to the feedback transmit signal 13 (which defines the output impedance of the circuit 10 as presented to the signal line pair 16 as discussed above). The resulting voltage across the selectable impedance 28 ($Z_c$) drives the current amplifier 32, thereby producing the differential output current used for defining the termination impedance.

Figure 2:
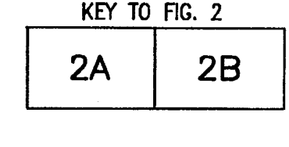
FIG. 2 is a schematic diagram of one embodiment of the signal interface circuit of FIG. 1.
Figure 2A:
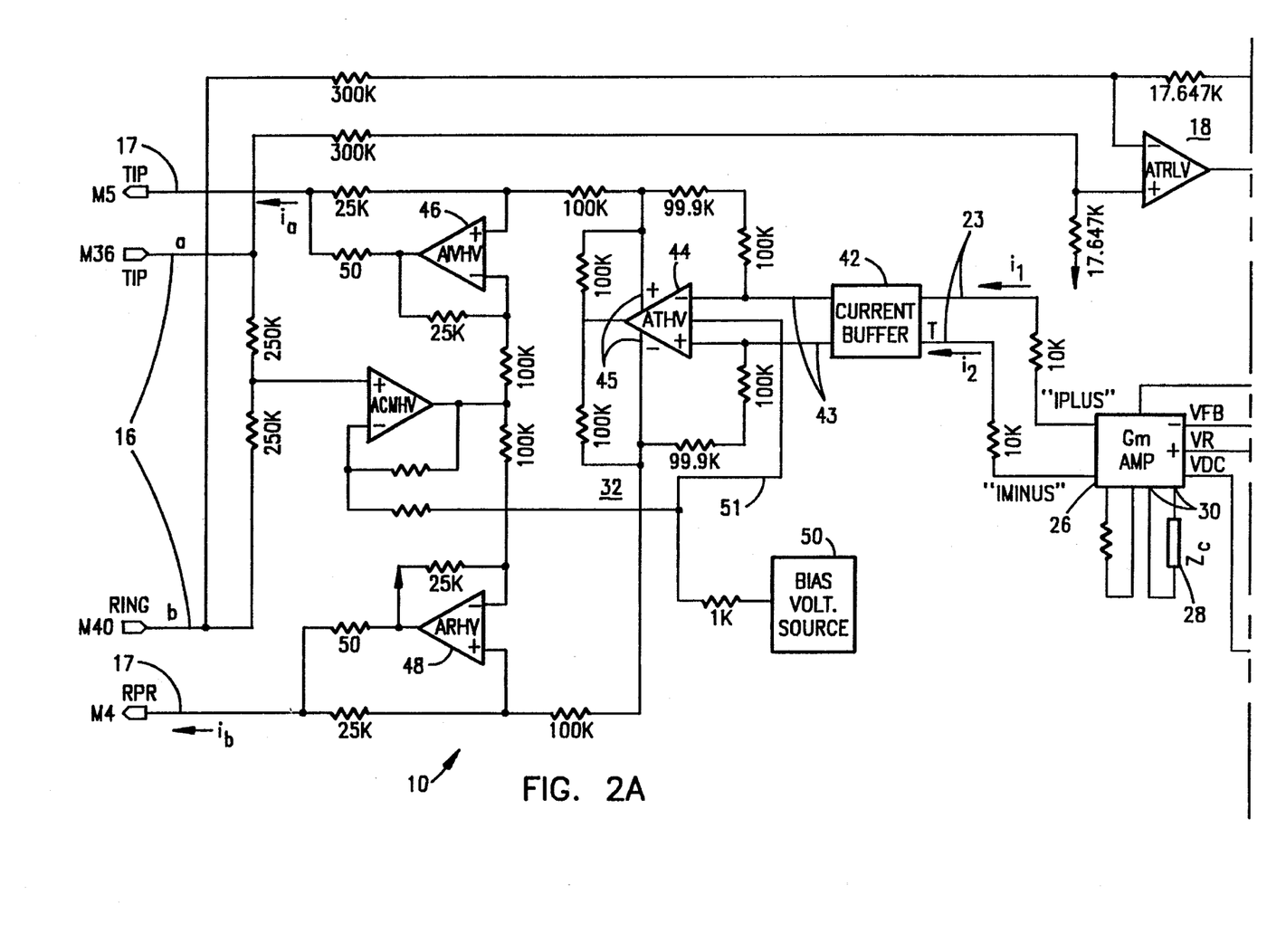
Figure 2B:
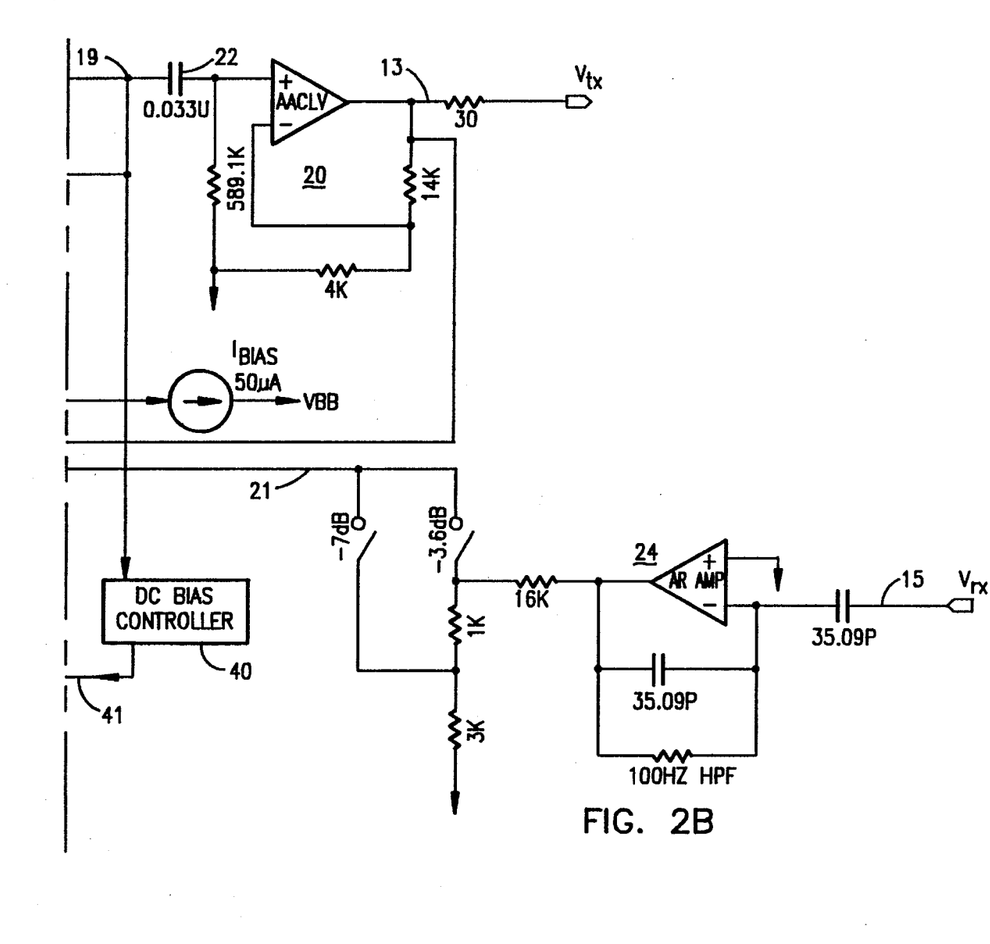

Referring to FIG. 2, one embodiment of a signal interface circuit 10 with selectable signal interface parameters in accordance with the present invention can be realized as shown. Outgoing signals are received from the signal line pair 16 and amplified by the transmitter amplifiers 18, 20 to produce the transmit signal 13. The transmitter amplifiers 18, 20 include operational amplifier ATRLV, AACLV and can be designed in accordance with well known principles. The output signal 19 from the first transmitter amplifier 18 is also provided to a dc bias controller 40 which provides a dc bias voltage 41 to the transconductance amplifier 26. This dc bias voltage 41 is set typically between 10 millivolts and 1 volt in normal line feeding mode, i.e. the tip terminal more positive than the ring terminal. (The outgoing signal on the signal line pair 16 is also applied across a resistive voltage divider which provides an input to an operational amplifier ACMHV which, in turn, provides a biasing voltage within the receiver output amplifier 32.)

The receive signal 15 is amplified by an operational amplifier ARAMP and applied to a switch network including switches C1 and C1B which selectively provide a gain of −3.5 DB or −7 dB. The resulting input signal 21 and the transmit signal 13 are applied to the transconductance amplifier 26, as discussed above. The transconductance amplifier 26 is biased by a current source providing a bias current $I_{BIAS}$ of approximately 50 microamperes.

The output currents $i_1$ ("IPLUS") and $i_2$ ("IMINUS") are applied to the current amplifier 32. The input stage of the current amplifier 32 is a current buffer 42 (discussed further below) the differential output of which drives an operational amplifier AIVHV, which in turn, differentially drives two additional operational amplifiers 46, 48 to provide the differential output currents $i_a$, $i_b$. The output currents $i_a$, $i_b$ are applied to nodes TPR and RPR which, in turn, are resistively coupled (not shown) to the "tip" and "ring" terminals forming nodes a and b of the signal line pair 16. The first operational amplifier 44 serves as a differential current-to-differential voltage converter, with the resulting differential output voltages driving the output operational amplifiers 46, 48 which serve as voltage-to-current converters. A bias voltage source 50 provides a dc bias voltage 51 of approximately half the battery voltage, i.e. −26 volts when powered from a −52 volt battery supply.

Figure 3A:
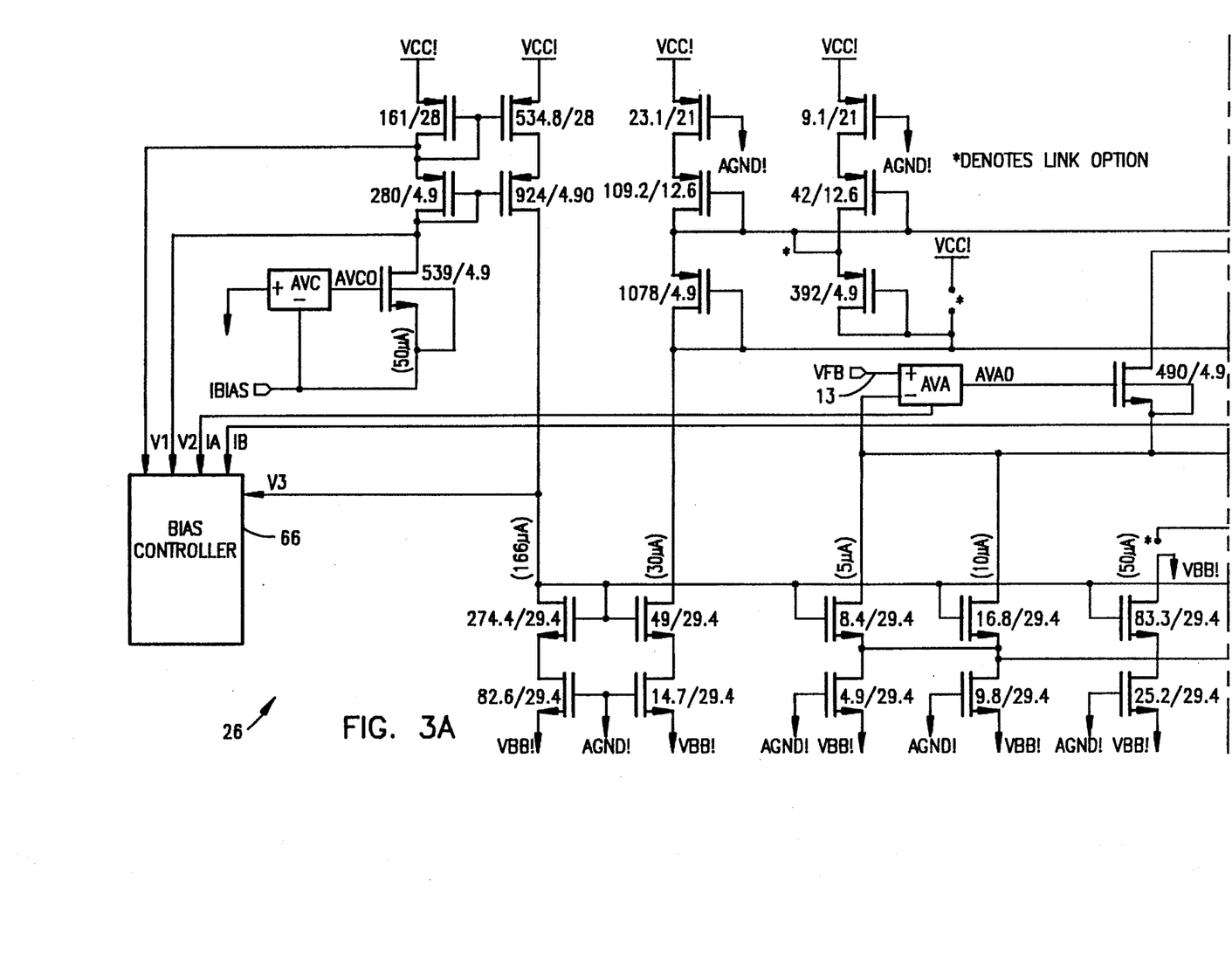
FIG. 3 is a schematic diagram of one embodiment of the transconductance amplifier of FIG. 2.
Figure 3B:
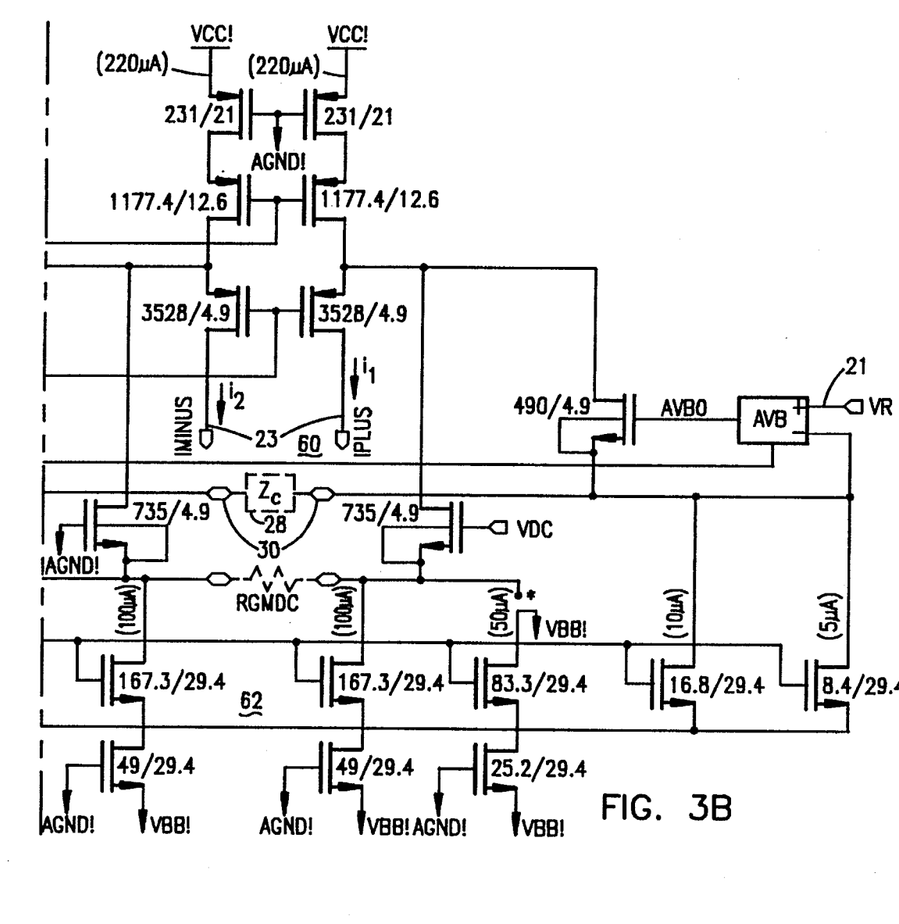
Figure 4:
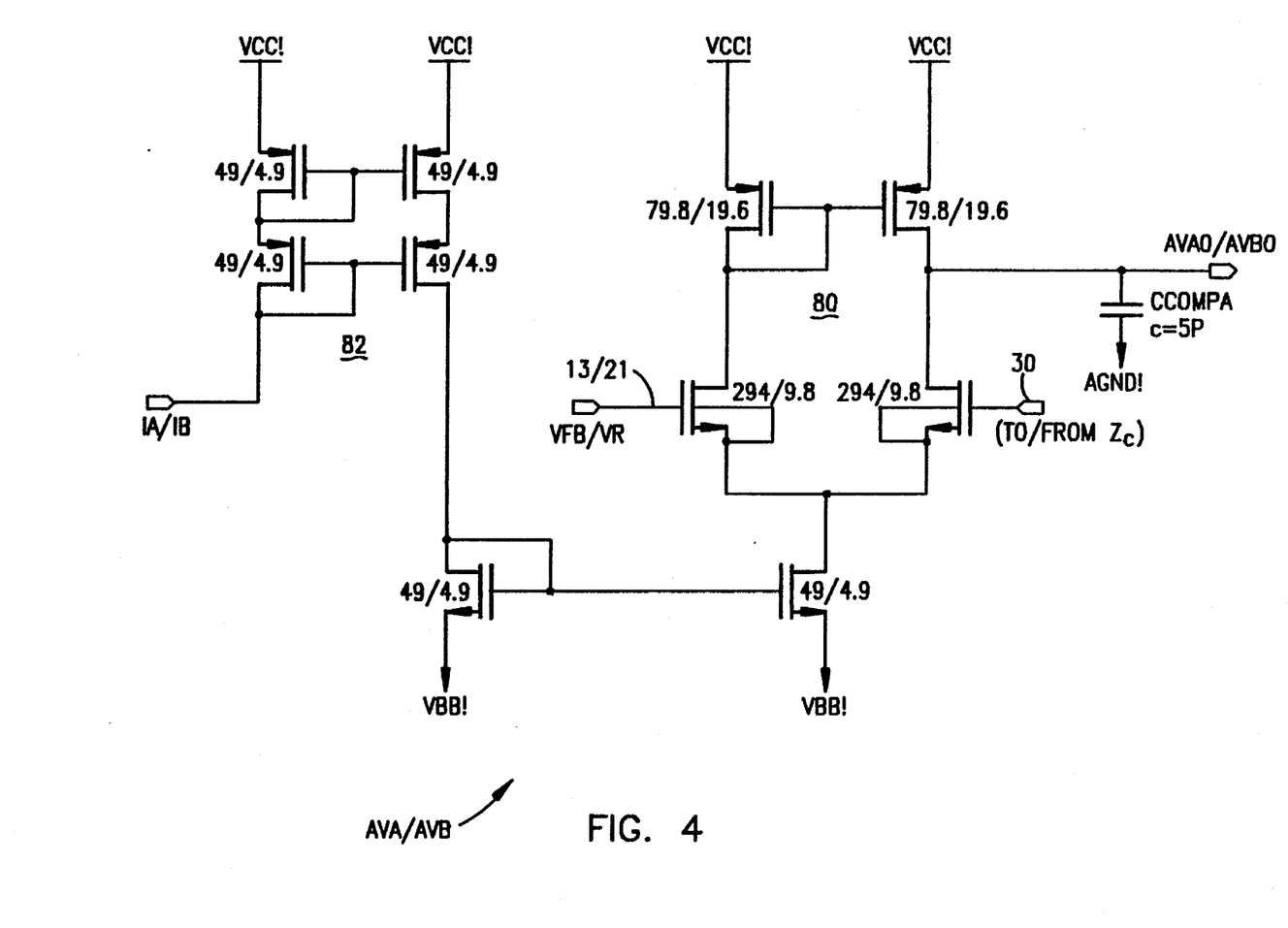
FIG. 4 is a schematic diagram of the differential input amplifiers of FIG. 3.
Figure 5:
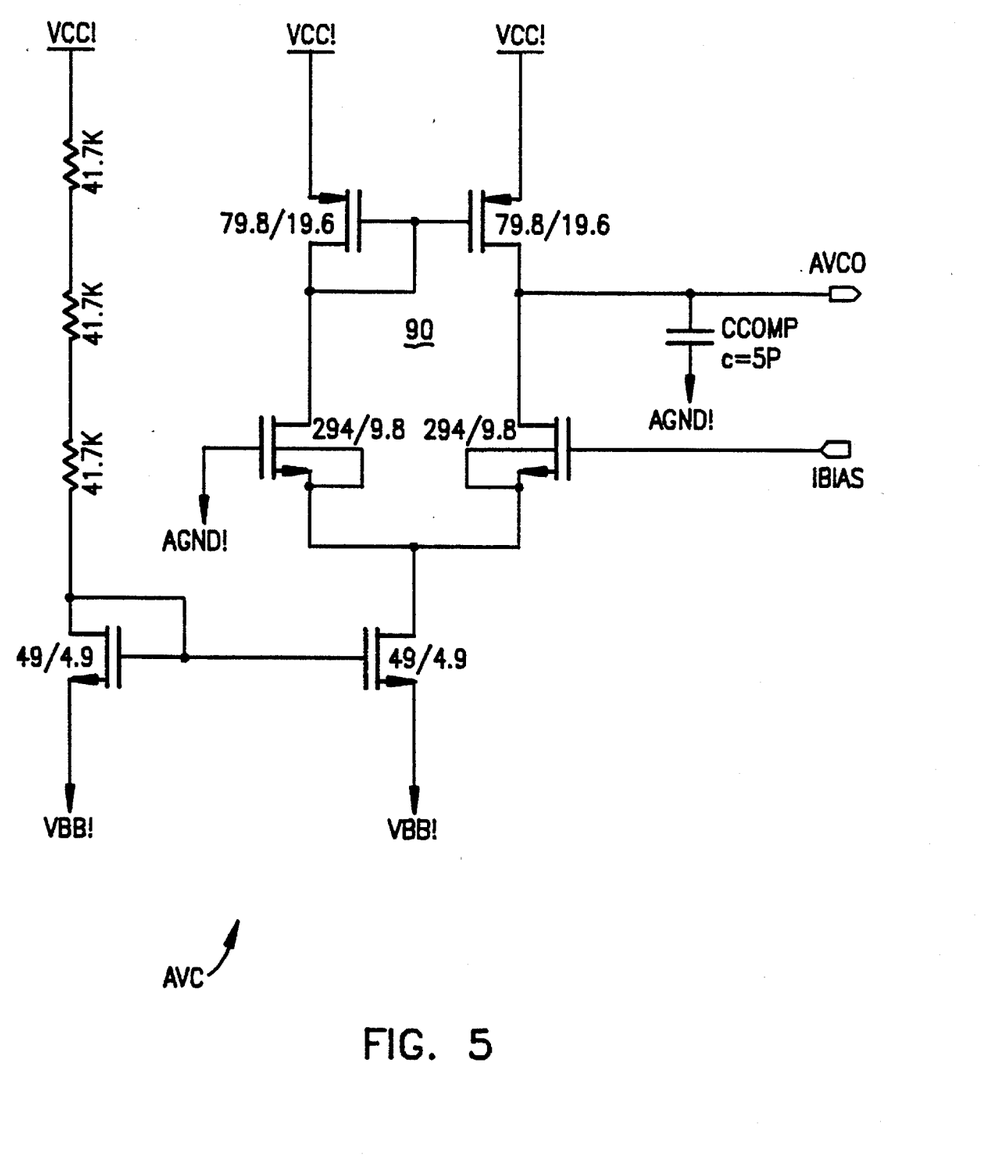
FIG. 5 is a schematic diagram of the bias driver of FIG. 3.

The numeric legends adjacent the various MOSFETs shown in FIGS. 2–5 indicate the channel widths and lengths of their respective transistors. (For example, in FIG. 3, the channel width and length of N-MOSFET MNV3 are 735 microns (735μ) and 4.9 microns (4.9μ), respectively. In FIGS. 3–5, the power supply terminals labelled as VCC! and VBB! provide +5 and −5 volts dc, respectively, while the terminal labelled as AGND! is connected to circuit ground (e.g. as represented by the well known ground symbol "∇" in FIG. 2).

Referring to FIG. 3, one embodiment of the transconductance amplifier 26 can be realized as shown. The input signals 13, 21 are buffered by input differential amplifiers AVA, AVB and applied to a complementary metal oxide semiconductor field effect transistor (CMOSFET) amplifier 60 across which the impedance circuit 28 is connected. Also connected across this differential amplifier 60 is a resistor RGMDC which sets the dc current gain for the transconductance amplifier 26. (This resistor RGMDC has a value of approximately 26 kilohms.) The differential amplifier 60 is biased by a current biasing circuit 62 which, in turn, is driven by a current mirror circuit 64. The current mirror circuit 64 is biased by the above-noted biasing current $I_{BIAS}$ and is controlled by a differential bias driver AVC.

A bias controller 66 receives as inputs voltage V1 (approximately 3.5 volts) and voltage V2 (approximately 2.0 volts) from the current mirror circuit 64 and voltage V3 (approximately −2 volts). In accordance with these input voltages V1, V2, V3, the bias controller sinks bias currents IA and IB from the input differential buffer amplifiers AVA and AVB, respectively.

The connections identified by asterisks("*") are ones that can be modified from those as shown to provide for additional current drive for the differential amplifier 60, thereby increasing the potential range of load impedances $Z_L$ which can be driven by the signal interface circuit 10.

Referring to FIG. 4, the input differential amplifiers AVA and AVB of the transconductance amplifier 26 of FIG. 3 can be realized as shown. A CMOSFET differential amplifier 80 is biased by a current mirror circuit 82 which is driven by the bias current IA/IB (discussed above). One input is connected to the impedance circuit 28, while the other input receives the transmit signal 13 or buffered receive signal 21 (discussed above). The output signal AVAO/AVBO is then provided to the appropriate input of the CMOSFET differential amplifier circuit 60 of FIG. 3.

Referring to FIG. 5, the bias driver AVC for the current mirror circuit 64 of FIG. 3 can be realized as shown. With the non-inverting input grounded and the inverting input biased by the voltage present on the $I_{BIAS}$ current line, an output voltage AVCO is generated for driving the current mirror circuit 64 of FIG. 3.

Figure 6:
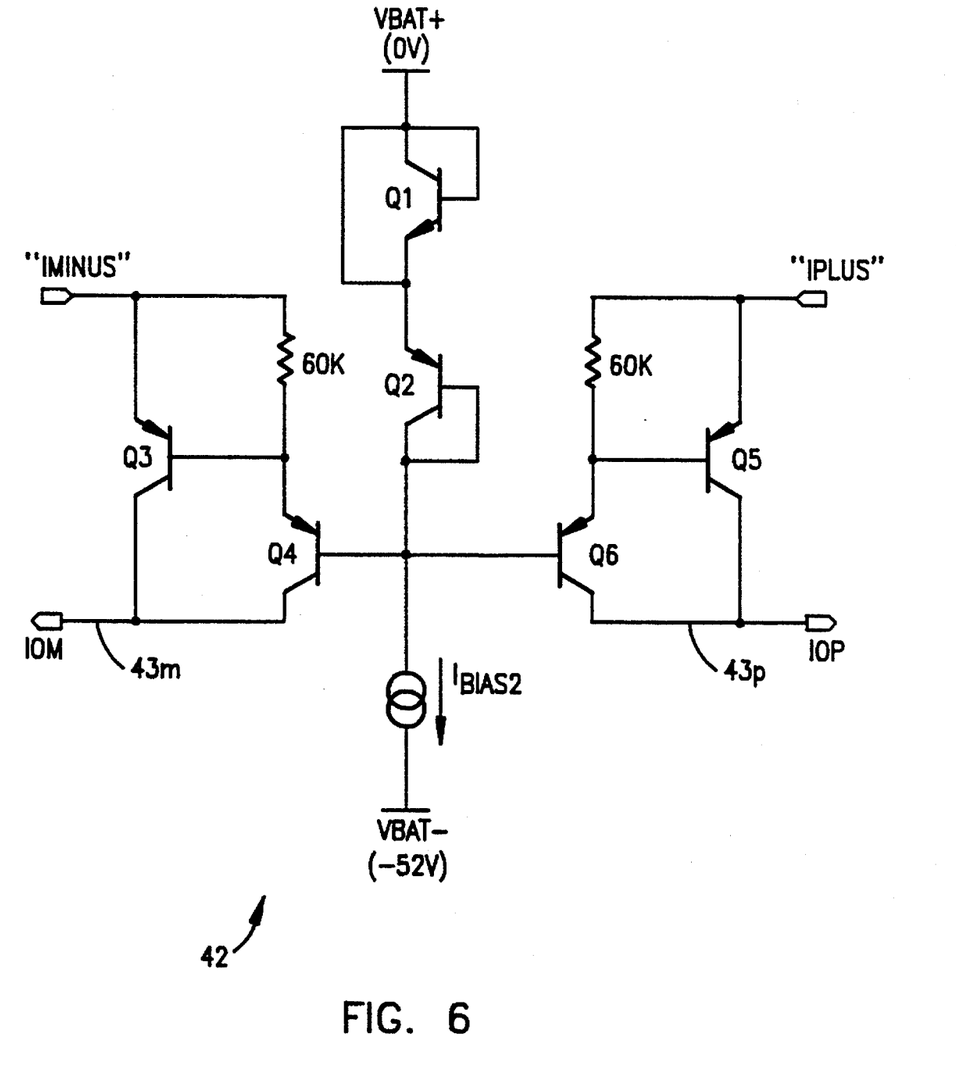
FIG. 6 is a schematic diagram of the current buffer of FIG. 2.

Referring to FIG. 6, the current buffer 42 of FIG. 2 can be realized with NPN and PNP bipolar junction transistors as shown. Biased by a −52 volt dc source (VBAT) and a bias current $I_{BIAS2}$ of approximately 150 microamperes, and with transistor Q2 operating as a zener diode, a dc voltage of approximately −7.6 volts appears at the base terminals of transistors Q4 and Q6. With the differential currents IPLUS and IMINUS from the transconductance amplifier 26 at the emitter terminals of transistors Q5 and Q3, respectively, the differential output currents 43m, 43p are generated.

Figure 7:
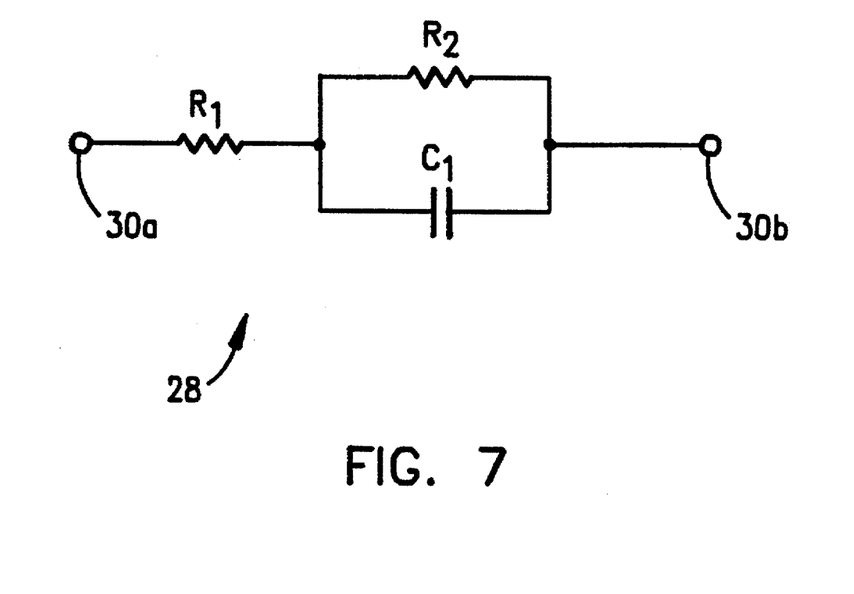
FIG. 7 is a schematic diagram of one embodiment of the selectable impedance circuit of FIG. 1.

Referring to FIG. 7, one embodiment of the impedance circuit 28 includes two resistors $R_1$, $R_2$ and a capacitor $C_1$, connected as shown. This impedance configuration, i.e. a resistor in series with a parallel combination of a resistor and capacitor, corresponds to the impedance configuration which typically represents the line impedance $Z_L$ of the signal line pair 16 (FIG. 1). The actual component values for the resistors $R_1$, $R_2$ and capacitor $C_1$, however, do not equal their counterparts in the line impedance $Z_L$. Rather, the component values for the impedance circuit 28 must be scaled in accordance with the gain factors of the transconductance amplifier 26, current amplifier 32, differential voltage amplifier 18 and buffer amplifier 20. For the embodiment of the signal interface circuit 10 shown in FIG. 2, this scaling factor is approximately 137. Accordingly, to provide an output impedance $Z_o$ which equaled a signal line pair 16 impedance $Z_L$ of 200 ohms in series with a parallel combination of 680 ohms and a capacitance of 100 nanofarads, the values of the components in the impedance circuit 28 would be: $R_1$=27.4 kilohms; $R_2$=93.16 kilohms; and $C_1$=730 picofarads.

Attached hereto as Appendix A and incorporated herein by reference is a preliminary data sheet prepared by the Assignee of the present invention for an integrated circuit containing an embodiment of a signal interface circuit with selectable signal interface parameters in accordance with the present invention.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a signal interface circuit with selectable signal interface parameters, said signal interface circuit comprising:

a pair of impedance terminals for coupling to an impedance circuit having a selectable impedance value associated therewith;

a pair of signal terminals for coupling to an external signal line pair and conducting outgoing and incoming signals therefrom and thereto, respectively, wherein said pair of signal terminals has a definable termination impedance associated therewith and said external signal line pair has a line impedance associated therewith, and wherein said definable termination impedance is defined in accordance with said selectable impedance value;

a transmitter circuit, coupled to said pair of signal terminals and having a definable transmitter transfer function associated therewith, for receiving said outgoing signal and providing a transmit signal in accordance with said definable transmitter transfer function, wherein said definable transmitter transfer function is defined in accordance with said selectable impedance value; and a receiver circuit, coupled to said pair of impedance terminals, said pair of signal terminals and said transmitter circuit and having a definable receiver transfer function associated therewith, for receiving an input signal and said transmit signal and providing said incoming signal in accordance with said definable receiver transfer function, wherein said definable receiver transfer function is defined in accordance with said selectable impedance value.

2. An apparatus as recited in claim 1, wherein said definable termination impedance is defined to match said line impedance.

3. An apparatus as recited in claim 1, further comprising an impedance circuit having said selectable impedance value associated therewith.

4. An apparatus as recited in claim 3, wherein said impedance circuit comprises resistive and capacitive elements.

5. An apparatus as recited in claim 1, wherein said transmitter circuit comprises a differential amplifier and said outgoing signal comprises a differential signal.

6. An apparatus as recited in claim 1, wherein said receiver circuit comprises a first differential amplifier, coupled to said pair of impedance terminals and said transmitter circuit, for differentially receiving said input signal and said transmit signal and providing a first differential output signal.

7. An apparatus as recited in claim 6, wherein said receiver circuit further comprises a second differential amplifier, coupled to said first differential amplifier and said pair of signal terminals, for receiving said first differential output signal and providing a second differential output signal as said incoming signal.

8. An apparatus as recited in claim 1, wherein said receiver circuit comprises a transconductance amplifier, coupled to said pair of impedance terminals and said transmitter circuit and having a definable transconductance associated therewith, for receiving a first voltage signal as said input signal and a second voltage signal as said transmit signal and providing an output current signal in accordance with said definable transconductance, wherein said definable transconductance is defined in accordance with said selectable impedance value.

9. An apparatus as recited in claim 1, further comprising a buffer amplifier, coupled to said receiver circuit, for receiving and buffering a receive signal and providing said input signal, wherein operation of said buffer amplifier does not affect either one of said definable termination impedance or said definable transmitter transfer function.

10. An apparatus as recited in claim 1, further comprising at least one integrated circuit into which said signal interface circuit is integrated.

11. A method of providing an apparatus including a signal interface circuit with selectable signal interface parameters, said method comprising the steps of:

providing a pair of impedance terminals for coupling to an impedance circuit having a selectable impedance value associated therewith;

providing a pair of signal terminals for coupling to an external signal line pair and conducting outgoing and incoming signals therefrom and thereto, respectively, wherein said pair of signal terminals has a definable termination impedance associated therewith and said external signal line pair has a line impedance associated therewith, and wherein said definable termination impedance is defined in accordance with said selectable impedance value;

providing a transmitter circuit, coupled to said pair of signal terminals and having a definable transmitter transfer function associated therewith, for receiving said outgoing signal and providing a transmit signal in accordance with said definable transmitter transfer function, wherein said definable transmitter transfer function is defined in accordance with said selectable impedance value; and providing a receiver circuit, coupled to said pair of impedance terminals, said pair of signal terminals and said transmitter circuit and having a definable receiver transfer function associated therewith, for receiving an input signal and said transmit signal and providing said incoming signal in accordance with said definable receiver transfer function, wherein said definable receiver transfer function is defined in accordance with said selectable impedance value.

12. A method as recited in claim 11, wherein said step of providing a pair of signal terminals for coupling to an external signal line pair and conducting outgoing and incoming signals therefrom and thereto, respectively, comprises providing a pair of signal terminals having an associated, definable termination impedance which is defined to match said line impedance.

13. A method as recited in claim 11, further comprising the step of providing an impedance circuit having said selectable impedance value associated therewith.

14. A method as recited in claim 13, wherein said step of providing an impedance circuit having said selectable impedance associated therewith comprises providing resistive and capacitive elements.

15. A method as recited in claim 11, wherein said step of providing a transmitter circuit comprises providing a differential amplifier and said outgoing signal comprises a differential signal.

16. A method as recited in claim 11, wherein said step of providing a receiver circuit comprises providing a first differential amplifier, coupled to said pair of impedance terminals and said transmitter circuit, for differentially receiving said input signal and said transmit signal and generating a first differential output signal.

17. A method as recited in claim 16, wherein said step of providing a receiver circuit further comprises providing a second differential amplifier, coupled to said first differential amplifier and said pair of signal terminals, for receiving said first differential output signal and generating a second differential output signal as said incoming signal.

18. A method as recited in claim 11, wherein said step of providing a receiver circuit comprises providing a transconductance amplifier, coupled to said pair of impedance terminals and said transmitter circuit and having a definable transconductance associated therewith, for receiving a first voltage signal as said input signal and a second voltage signal as said transmit signal and generating an output current signal in accordance with said definable transconductance, wherein said definable transconductance is defined in accordance with said selectable impedance value.

19. A method as recited in claim 11, further comprising the step of providing a buffer amplifier, coupled to said receiver circuit, for receiving and buffering a receive signal and providing said input signal, wherein operation of said buffer amplifier does not affect either one of said definable termination impedance or said definable transmitter transfer function.

20. A method as recited in claim 11, further comprising the step of providing at least one integrated circuit into which said signal interface circuit is integrated.

21. A method of providing a signal interface with selectable signal interface parameters, said method comprising the steps of:

defining a termination impedance in accordance with a selectable impedance value;

defining a transmitter transfer function in accordance with said selectable impedance value;

defining a receiver transfer function in accordance with said selectable impedance value;

coupling to a signal line pair with a pair of signal terminals, wherein said signal line pair has a line impedance associated therewith and said pair of signal terminals has said defined termination impedance associated therewith;

conducting an outgoing signal from said signal line pair via said pair of signal terminals;

amplifying said outgoing signal and providing a transmit signal in accordance with said defined transmitter transfer function;

receiving an input signal and said transmit signal and providing an incoming signal in accordance with said defined receiver transfer function; and conducting said incoming signal to said signal line pair via said pair of signal terminals.

22. A method as recited in claim 21, wherein said step of defining a termination impedance in accordance with a selectable impedance value comprises defining said termination impedance to match said line impedance.

23. A method as recited in claim 21, further comprising the step of establishing said selectable impedance value with an impedance circuit including resistive and capacitive elements.

24. A method as recited in claim 21, wherein said step of amplifying said outgoing signal and providing a transmit signal in accordance with said defined transmitter transfer function comprises differentially amplifying a differential signal as said outgoing signal.

25. A method as recited in claim 21, wherein said step of receiving an input signal and said transmit signal and providing an incoming signal in accordance with said defined receiver transfer function comprises differentially receiving said input signal and said transmit signal and generating a first differential output signal.

26. A method as recited in claim 25, wherein said step of receiving an input signal and said transmit signal and providing an incoming signal in accordance with said defined receiver transfer function further comprises receiving said first differential output signal and generating a second differential output signal as said incoming signal.

27. A method as recited in claim 21, wherein said step of receiving an input signal and said transmit signal and providing an incoming signal in accordance with said defined receiver transfer function comprises:

defining a transconductance in accordance with said selectable impedance value;

receiving a first voltage signal as said input signal;

receiving a second voltage signal as said transmit signal; and generating an output current signal in accordance with said defined transconductance.

28. A method as recited in claim 21, further comprising the step of receiving and buffering a receive signal and providing said input signal without affecting either one of said defined termination impedance or said defined transmitter transfer function.

29. A method as recited in claim 21, further comprising the step of performing said recited steps for providing a signal interface with selectable signal interface parameters within at least one integrated circuit.

* * * * *